US012632560B1

(12) United States Patent
Tanner et al.

(10) Patent No.: US 12,632,560 B1
(45) Date of Patent: May 19, 2026

(54) SYSTEM AND METHOD FOR ANALYZING AND QUANTIFYING VULNERABILITY

(71) Applicant: Nationwide Mutual Insurance Company, Columbus, OH (US)

(72) Inventors: Joseph G. Tanner, Columbus, OH (US); Gregory J. Rick, Colombus, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 267 days.

(21) Appl. No.: 17/556,779

(22) Filed: Dec. 20, 2021

Related U.S. Application Data

(60) Provisional application No. 63/128,430, filed on Dec. 21, 2020.

(51) Int. Cl.
*G06F 21/57* (2013.01)
*G06Q 10/0637* (2023.01)

(52) U.S. Cl.
CPC ..... *G06F 21/577* (2013.01); *G06Q 10/06375* (2013.01)

(58) Field of Classification Search
None
See application file for complete search history.

(56) References Cited

U.S. PATENT DOCUMENTS

| | | | | | |
|---|---|---|---|---|---|
| 9,747,570 | B1 * | 8/2017 | Vescio | ................ | H04L 63/1425 |
| 9,749,344 | B2 * | 8/2017 | Watters | ................ | G06F 21/552 |
| 12,117,823 | B1 * | 10/2024 | Spirko | ................ | G06F 16/2228 |
| 2013/0104237 | A1 * | 4/2013 | Riley | .................... | G06Q 10/10 |
| | | | | | 726/25 |
| 2014/0359780 | A1 * | 12/2014 | Zandani | ............. | H04L 63/1433 |
| | | | | | 726/25 |
| 2015/0205965 | A1 * | 7/2015 | Kilgallon | ............. | G06F 21/554 |
| | | | | | 726/25 |
| 2016/0197935 | A1 * | 7/2016 | Jamison | ............... | G06F 21/604 |
| | | | | | 726/27 |
| 2018/0069882 | A1 * | 3/2018 | Vescio | ............... | H04L 63/1425 |
| 2019/0036958 | A1 * | 1/2019 | Shi | ...................... | H04L 63/1466 |
| 2019/0052664 | A1 * | 2/2019 | Kibler | .................. | G06F 11/301 |
| 2021/0226996 | A1 * | 7/2021 | Remez | .................. | H04L 63/20 |
| 2022/0070198 | A1 * | 3/2022 | Willis | ............... | H04L 63/1425 |
| 2022/0201042 | A1 * | 6/2022 | Crabtree | ............ | G06F 16/2477 |

FOREIGN PATENT DOCUMENTS

| | | | | | |
|---|---|---|---|---|---|
| WO | WO-2009018142 | A2 * | 2/2009 | ............ | G06Q 40/02 |

* cited by examiner

*Primary Examiner* — Fatoumata Traore
(74) *Attorney, Agent, or Firm* — Thomas E. Lees, LLC

(57) ABSTRACT

A method of deriving an aggregate vulnerability of a computer system, the method including identifying a threat event associated with a possible loss and based on the threat event, identifying a plurality of relevant controls configured to provide protection against the threat event. The method further including assigning an effectiveness score to each of the plurality of relevant controls, aggregating each effectiveness score assigned to each of the plurality of relevant controls to generate an aggregated effectiveness score and determining, based on the aggregated effectiveness score, a vulnerability score associated with the plurality of relevant controls.

22 Claims, 8 Drawing Sheets

100

102 — Receive and identify events leading to loss event

104 — Identify relevant controls and map to categories

106 — Evaluate control strength

108 — Determine vulnerability

100

102 — Receive and identify events leading to loss event

104 — Identify relevant controls and map to categories

106 — Evaluate control strength

108 — Determine vulnerability

SYSTEM AND METHOD FOR ANALYZING AND QUANTIFYING VULNERABILITY

CROSS-REFERENCE TO RELATED APPLICATIONS

This application claims the benefit of U.S. Provisional Patent Application No. 63/128,430 filed Dec. 21, 2020 entitled "System and Method for Analyzing and Quantifying Vulnerability", which is incorporated by reference herein in its entirety.

FIELD OF THE INVENTION

The invention relates to a system and method for analyzing and quantifying vulnerability, and more particularly, analyzing and quantifying the overall vulnerability of an asset or potential threat.

BACKGROUND OF THE INVENTION

Estimating the vulnerability of an asset based on the combined effectiveness of each of the controls protecting the asset is extremely useful and important in assessing threats. However, it can be difficult to precisely estimate and assess the vulnerability of an asset as the asset can be protected by multiple controls. This increases the complexity of the control environment. Accordingly, it is more efficient to estimate the effectiveness of an individual control protecting the asset and combining these individual controls to estimate an overall vulnerability estimate for the asset. This provides better precision and objectivity in estimating asset vulnerability.

BRIEF SUMMARY OF THE INVENTION

In some embodiments, the present invention provides a method of deriving an aggregate vulnerability of a computer system. The method includes identifying a threat event associated with a possible loss, based on the threat event, identifying a plurality of relevant controls configured to provide protection against the threat event, assigning an effectiveness score to each of the plurality of relevant controls, aggregating each effectiveness score assigned to each of the plurality of relevant controls to generate an aggregated effectiveness score, and determining, based on the aggregated effectiveness score, a vulnerability score associated with the plurality of relevant controls.

In some embodiments, the aggregated effectiveness score includes a plurality of effectiveness scores. The vulnerability score may be determined via a mathematical model associated with the effectiveness score. The mathematical model may be determined based on a relationship of the plurality of relevant controls.

In some embodiments, each of the plurality of relevant controls is associated with at least one control category. The plurality of relevant controls may be configured to be in series relationship with one another.

In some embodiments, the plurality of relevant controls are configured to be in parallel relationship with one another. The plurality of relevant controls may be configured to be in parallel and in series with one another.

In some embodiments, the effectiveness score is automatically determined based on metrics associated with each of the plurality of relevant controls.

In some embodiments, a relationship between the plurality of relevant controls is automatically determined based on scenarios stored in a database.

In some embodiments, the system is used to collect personal data and the method further includes based on the vulnerability score, updating at least one of anti-virus software, anti-malware software, spam filters, and phishing filters that are running on at least one component of the computer system. The update may be based on the vulnerability score reaching a predefined threshold.

Another embodiment of the present invention provides a computer implemented method including receiving, via an interface of a computer based application, data related to a loss event, the data including a threat event, identifying, via a processor of the computer based application, a plurality of controls associated with preventing the threat event from occurring, grouping, via the processor of the computer based application, the plurality of controls into a plurality of control categories, storing, via a database of the computer based application, a plurality of effectiveness scores associated with each of the plurality of control categories, wherein each of the plurality of effectiveness scores is a probability that each of the plurality of control categories prevents the threat event from occurring, assigning, via the processor of the computer based application, each of the plurality of effectiveness scores to each of the plurality of control categories, aggregating, via the processor of the computer based application, the effectiveness score for each of the plurality of control categories based on a relationship between the plurality of control categories to determine a vulnerability score and an annualized loss amount, and predicting, via the processor of the computer based application, a new vulnerability score and a new annualized loss based a change to one or more of the plurality of control categories.

In some embodiments, the method further includes filtering the data to remove redundant or irrelevant data. Each of the plurality of controls may independently prevent the threat event from occurring.

In some embodiments, at least two of the plurality of controls tandemly prevent the threat event from occurring.

In some embodiments, each of the plurality of effectiveness scores of each of the plurality of control categories is displayed, via the interface of the computer based application, as a percentage of threat events prevented by each of the plurality of control categories.

In some embodiments, the method further includes determining a plurality of non-effectiveness scores associated with each of the plurality of control categories, wherein each of the plurality of non-effectiveness scores is a probability that each of the plurality of control categories allows the threat event to occur. The vulnerability score may be a product of each of the plurality of non-effectiveness scores.

In some embodiments, the threat event is an event causing the loss event. The annualized loss may be an amount of money expended due to the loss event.

In some embodiments, the method further includes determining a plurality of effectiveness scores associated with each of the plurality of control categories, wherein each of the plurality of effectiveness scores is a probability that each of the plurality of control categories prevents the threat event from occurring.

In some embodiments, the vulnerability score is equal to one minus a product of each of the plurality of effectiveness scores.

BRIEF DESCRIPTION OF THE SEVERAL VIEWS OF THE DRAWINGS

The foregoing summary, as well as the following detailed description of embodiments of the system and method for analyzing and quantifying vulnerability, will be better understood when read in conjunction with the appended drawings of an exemplary embodiment. It should be understood, however, that the invention is not limited to the precise arrangements and instrumentalities shown.

DETAILED DESCRIPTION OF THE INVENTION

Exemplary embodiments of the present invention provide a system and method for analyzing and quantifying an overall vulnerability related to an asset. An embodiment of the present invention provides an exemplary system and methodology as shown in FIGS. 1-8. In use, the systems and methods presented herein may determine an overall vulnerability for a loss scenario where one or more controls are involved.

In some embodiments, the term vulnerability refers to a probability that a threat event becomes a loss event. In some embodiments, a vulnerability can be quantified. For example, if 15 out of 100 threat events are expected to result in a loss for a given asset (database, server, etc.), the vulnerability of that asset is 15%. In some embodiments, the term effectiveness refers to the probability that a control will be successful in achieving its objective. The objective may be to keep the threat event from becoming a loss event, or it may be to detect the threat event and trigger a response. For example, if a given control is likely to successfully stop a threat event 80% of the time, the control effectiveness is 80%. In some embodiments, the term susceptibility refers to the likelihood that a control will fail to achieve its objective. This is 1 minus the control's effectiveness. In the above example, the Susceptibility of the control is 20%.

Figure 1:
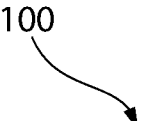
FIG. 1 is an exemplary method in accordance with one embodiment of the present invention.
Figure 1:
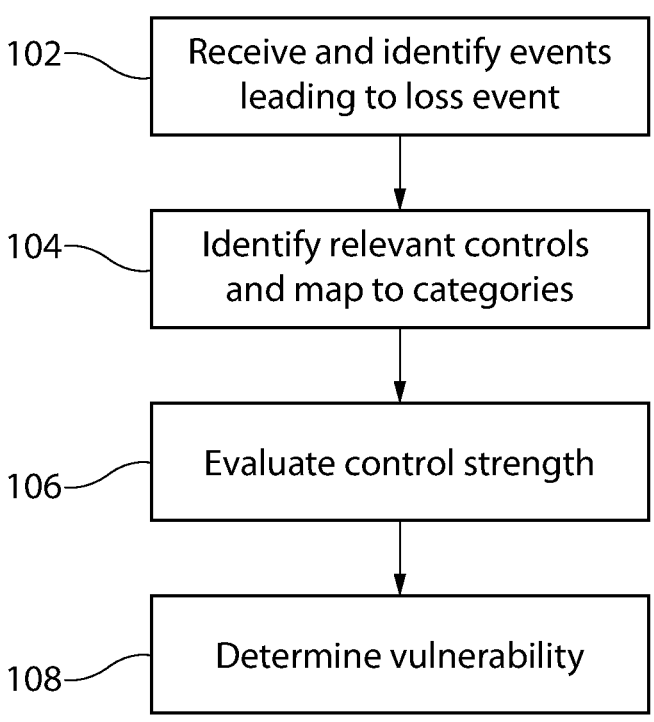
Figure 7:
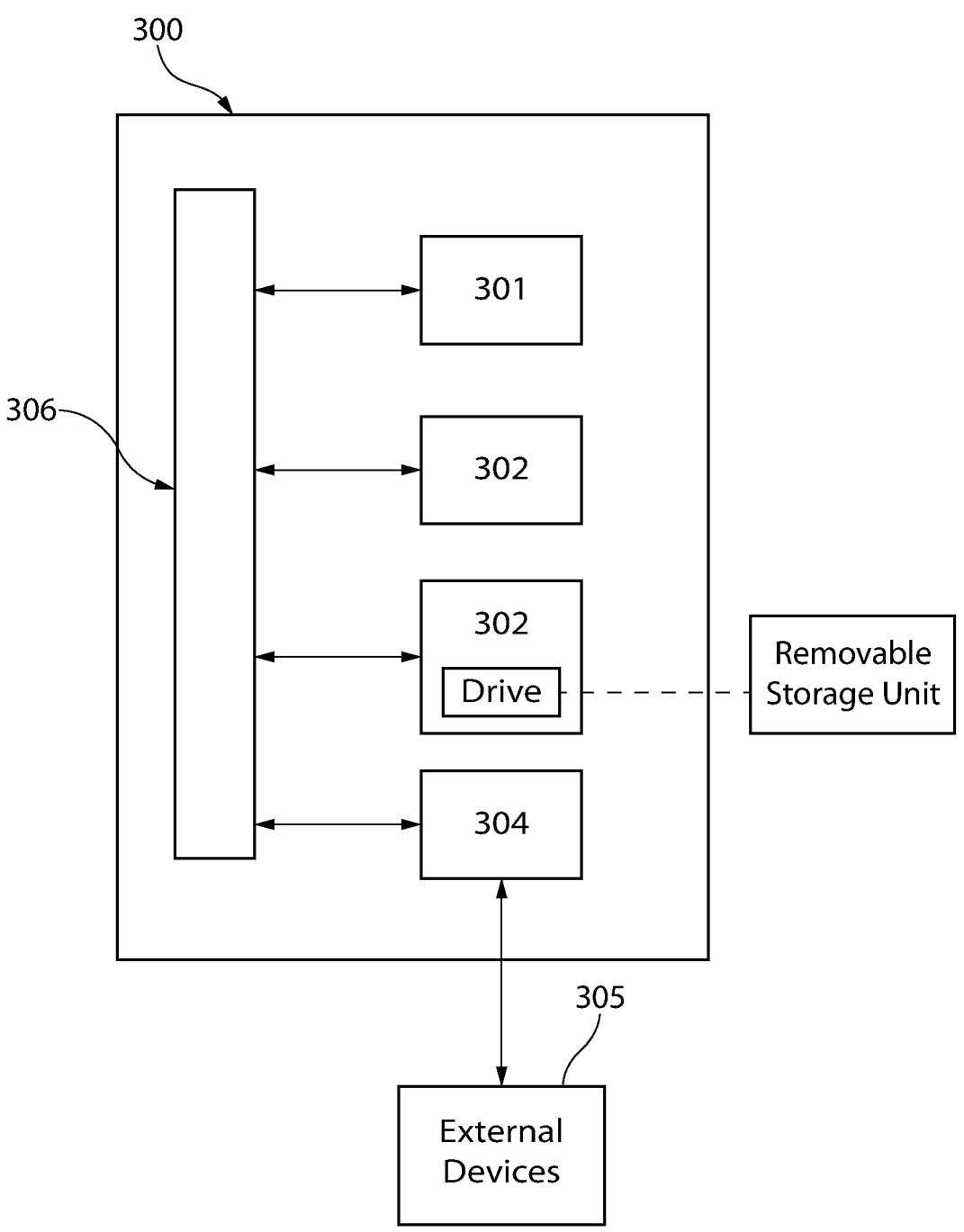
FIG. 7 is an exemplary computer system that may be used in connection with an embodiment of the present invention.
Figure 8:
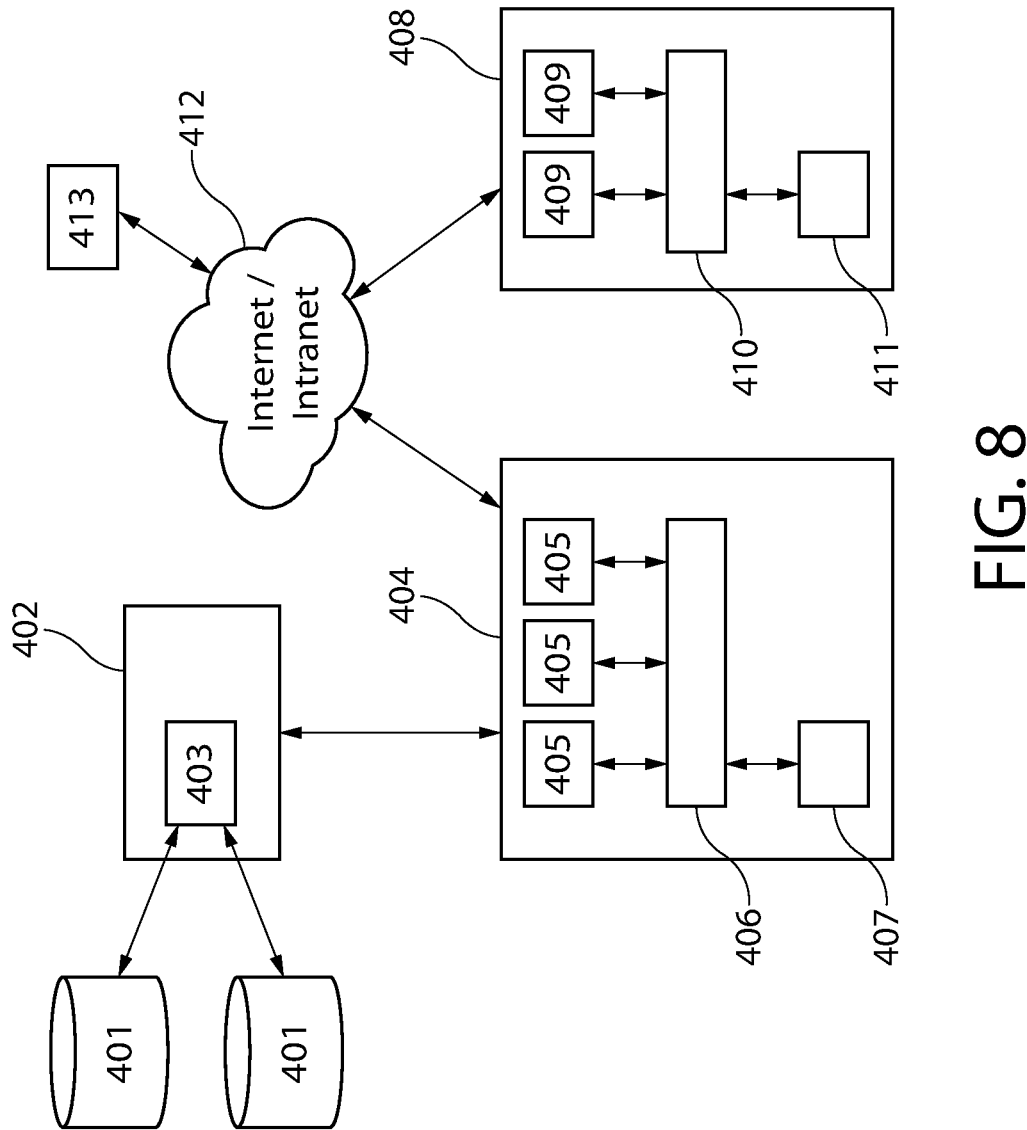
FIG. 8 is an alternative exemplary computer system that may be used in connection with an embodiment of the present invention.

Referring to FIGS. 1 and 7-8, there is described an exemplary method 100 that may be used to determine a vulnerability associated with a loss event. Method 100 is preferably implemented on computer system 300. The vulnerability score may indicate how susceptible an asset is to a threat or loss event. For example, a low vulnerability score indicates that there is a low probability that a threat will get to the asset and result in a loss event. In step 102, computer system 300 may receive and identify events leading to a loss event. In some embodiments, the identified events are a sequence of events. For example, computer system 300 may include an interface, which may be configured to receive data related to a potential loss event (e.g., the data may include an indication of a threat event).

Computer system 300 may identify events that are indicative of those that lead from a threat event to a loss event. The specific steps for preventing or mitigating the events may be identified so that the proper controls are identified and evaluated. The specific steps for preventing or mitigating an event that is indicative of leading from a threat event to a loss event may be identified by computer system 300 or a user. For example, in a phishing scenario, a sequence of events that are detected and identified by computer system 300 may include:

1. Attacker crafts and sends a phishing email message to a target, the phishing email including a malicious hyperlink
2. Target's email server receives phishing email and places it in the target's inbox
3. Target clicks on the malicious hyperlink in the email message
4. Malicious hyperlink results in malware installation on target's workstation
5. Malware allows attacker to escalate privileges and move laterally through the network
6. Attacker discovers valuable data on the network
7. Attacker ex-filtrates data In step 104, relevant controls may be identified, and those controls may be mapped to categories. For example, computer system 300 may identify which controls are in place and may map those controls to specific categories and/or groupings. In some embodiments, controls are identified and aggregated together prior to mapping them to categories and/or groupings. The categories may be based on the type of control or the threat that the control is configured to protect against.

The controls may be selected to provide protection for each event in the sequence of events identified in step 102. Referring to the example above, one or more controls may be identified for one or more steps of the phishing scenario (or for all of the steps). Table 1 shows an example of the sequence of events or steps from the example above and the corresponding relevant controls that are associated with each sequence of events or steps.

TABLE 1

| Step | Controls |
|---|---|
| 1. Craft, send phishing email | None |
| 2. Email server puts message in inbox | Anti-malware and anti-phishing features on the email server |
| 3. Target clicks malicious link | Awareness and training |
| 4. Malicious link installs malware | Secure configuration |
| 5. Privilege escalation, lateral movement | Access management Logging/alerting Responsive procedures |
| 6. Data discovery | Access management Network segmentation |
| 7. Data exfiltration | Data loss prevention Logging/alerting Responsive procedures |

The controls identified in step 104 may be grouped and/or mapped to control categories. In some embodiments, method 100 utilizes an industry framework of control categories. For example, in step 104, the controls may be mapped to the National Institute of Standards and Technology (NIST) Cyber Security Framework (CSF). However, the controls may be mapped to other types of categories, such as type of control or threat that the control is configured to protect against. The controls may be stored in a database. In some embodiments, computer system 300 utilizes an algorithm, such as a machine learning algorithm, to detect the controls being implemented and automatically maps the controls to one or more categories. The machine learning algorithm may be trained based on historical control data and prior loss events. In some embodiments, the machine learning algorithm is trained to predict which controls should be used or which categories should be used. Table 2 is an example of various controls mapped to NIST CSF categories.

TABLE 2

| Controls | NIST CSF Category |
| --- | --- |
| None | |
| Anti-malware and anti-phishing server features | PR.PT |
| Awareness and training | PR.AT |
| Secure configuration | PR.PT |
| Access management | PR.AC |
| Logging | PR.PT |
| Responsive procedures | PR.IP, PR.RS |
| Access management | PR.AC |
| Network segmentation | PR.PT |
| Data loss prevention | PR.DS |
| Logging | PR.PT |
| Responsive procedures | PR.IP, PR.RS |

In step 106, method 100 includes evaluating control strength. For example, one or more, or all of the controls identified in step 104 are evaluated for control strength. In some embodiments, an effectiveness score is determined for each control identified in step 104. The effectiveness score may be used to predict the strength of the control. In some embodiments, the effectiveness score leads to an evaluation of control strength. In some embodiments, the effectiveness score is determined based upon historical performance metrics. In some embodiments, the effectiveness score is automatically generated based on performance metrics. For example, an automation process using the algorithm (e.g., the machine learning algorithm) may include extracting control performance metrics from database 401 configured to store historical data associated with the controls, and algorithmically determining control effectiveness from the metrics. In some embodiments, the effectiveness scores are stored within database 401. In some embodiments, the effectiveness scores are associated with the control categories and the effectiveness score is a probability that a particular control category prevents the threat or loss event from occurring. The effectiveness score is preferably assigned to each of the control categories.

Database 401 may be dynamically updated such that the effectiveness score may vary over time (e.g., in real time, or lagging by a selected period). In some embodiments, the machine learning algorithm is trained and refined based upon updated effectiveness scores. For example, the machine learning algorithm may be trained and refined based upon previous events in which controls were used to protect against a threat event or a loss event. The effectiveness score of a specific control may be updated and refined based on whether the use of the control prevented or protected against a threat event and/or less event.

In some embodiments, operational/performance metrics associated with each control are determined and an algorithm, such as a machine learning algorithm, is used to combine those metrics into an effectiveness score for each control. Exemplary metrics include the number of days since the control was last updated with the latest information and/or intelligence about a threat. Another exemplary metric associated with a control includes an indication that the control has not been updated (e.g., for some identified or unidentified period of time). When applied, the algorithm may lower the effectiveness score due to the control not being the most up-to-date. In some embodiments, the algorithm (e.g., the machine learning algorithm) is executed by a processor or a computer program on a periodic basis (e.g., on a regular and repeating basis) and the results may be stored and/or updated in a database. In some embodiments, different effectiveness scores may be determined for the same control and for the same metrics, depending on the threat, which would be implemented into the algorithm. The algorithm may further generate multiple effectiveness scores (e.g., one per threat or one per category of threats).

In some embodiments, the effectiveness score is an approximation of the percentage of events for which the control and/or control category will perform as desired. For example, if a control is expected to prevent 80% of events (or attacks) that could lead to a loss event, then that control is assigned an effectiveness score of 80%. In some embodiments, an assessment as to whether or not an event could possibly lead to a loss event in the absence of a particular control is undertaken using monitoring techniques and knowledge-based data associated with the impact of various known attacks (e.g., in some cases known to those of skill in the art). For example, data regarding penetration testing is inputted into the algorithm to attain an objective control effectiveness score based on actual test results.

In some embodiments, a user interface displays the effectiveness scores. The user interface may be linked to or integrated within computer system 300. In some embodiments, the effectiveness score is displayed by the user interface as a percentage of events that were prevented by the control categories from becoming loss events. In some embodiments, a susceptibility score and/or non-effectiveness score is determined for each control. Susceptibility scores and/or non-effectiveness scores of each control are quantified with respect to a given threat. In some embodiments, the susceptibility score is 1 (or 100%) minus the effectiveness score. For example, if a control is expected to detect 80% of events that could lead from a specific threat event to a specific loss event, thus being 20% susceptible to a given threat, then that control is given a susceptibility score of 20%.

In step 108, an overall vulnerability score is determined from the effectiveness score of the control and/or control category obtained in step 106. In some embodiments, the overall vulnerability score is the probability that a loss event occurs due to the threat event. In some embodiments, the vulnerability score is associated with a loss amount. For example, the vulnerability score may be applied to overall expenditure expectations if the loss event occurs, to determine a projected loss amount. In some embodiments, the projected loss amount indicates the amount of money projected to be expended due to the loss event. For example, a positive correlation between vulnerability score and loss magnitude risk factors may be leveraged to adjust the loss event magnitude using deterministic or non-deterministic quantitative risk analysis methods. In some embodiments, the effectiveness score for the controls are combined to produce an aggregated effectiveness score. The aggregated effectiveness score may be based, for example, on the relationship of the controls to each other.

In some embodiments, the controls are in series, in parallel, or a combination thereof. In one aspect, the aggregated effectiveness score takes the controls relationship into account and a score specific to that particular relationship is generated. In some embodiments, a single control independently provides substantially full protection from a threat event (e.g., when the control is 100% effective). In some embodiments, no additional controls are needed. When an asset is protected by multiple controls/control categories, each control/control category may be treated as a filter that screens out some threats/loss events and lets other threats/loss events through. In some embodiment, the percentage of threats blocked by each control/control category contributes to the effectiveness score. In some embodiments, the algorithm (e.g., the machine learning algorithm) predicts which arrangement of controls would be best utilized to prevent a threat event and/or a loss event and either indicates to the user the arrangement or causes computer system 300 to put into place the predicted arrangement of controls.

In some embodiments, one or more processors 301 of computer system 300 are configured to aggregate each of the plurality of control categories based on a relationship between the control categories to determine a vulnerability score and an annualized projected loss amount (e.g., an annualized projected loss or a projected loss based on a different selected period). In one aspect, the data related to the loss event is filtered to remove redundant or irrelevant data.

In some embodiments, one or more processors 301 are configured to predict a new vulnerability score and/or a new annualized loss for the aggregate of all controls based on a change to one or more of the control categories. For example, the present invention allows users to interact with the user interface of computer system 300 to change various parameters, such as the controls and/or control categories. In some embodiments, a user interacts with the interface of computer system 300 to update the anti-virus or anti-malware software, or update the spam/phishing filters. In some embodiments, new vulnerability scores and/or annualized loss amounts are predicted for the aggregate of all controls used, based on the changing of the controls and/or control categories.

Figure 2:
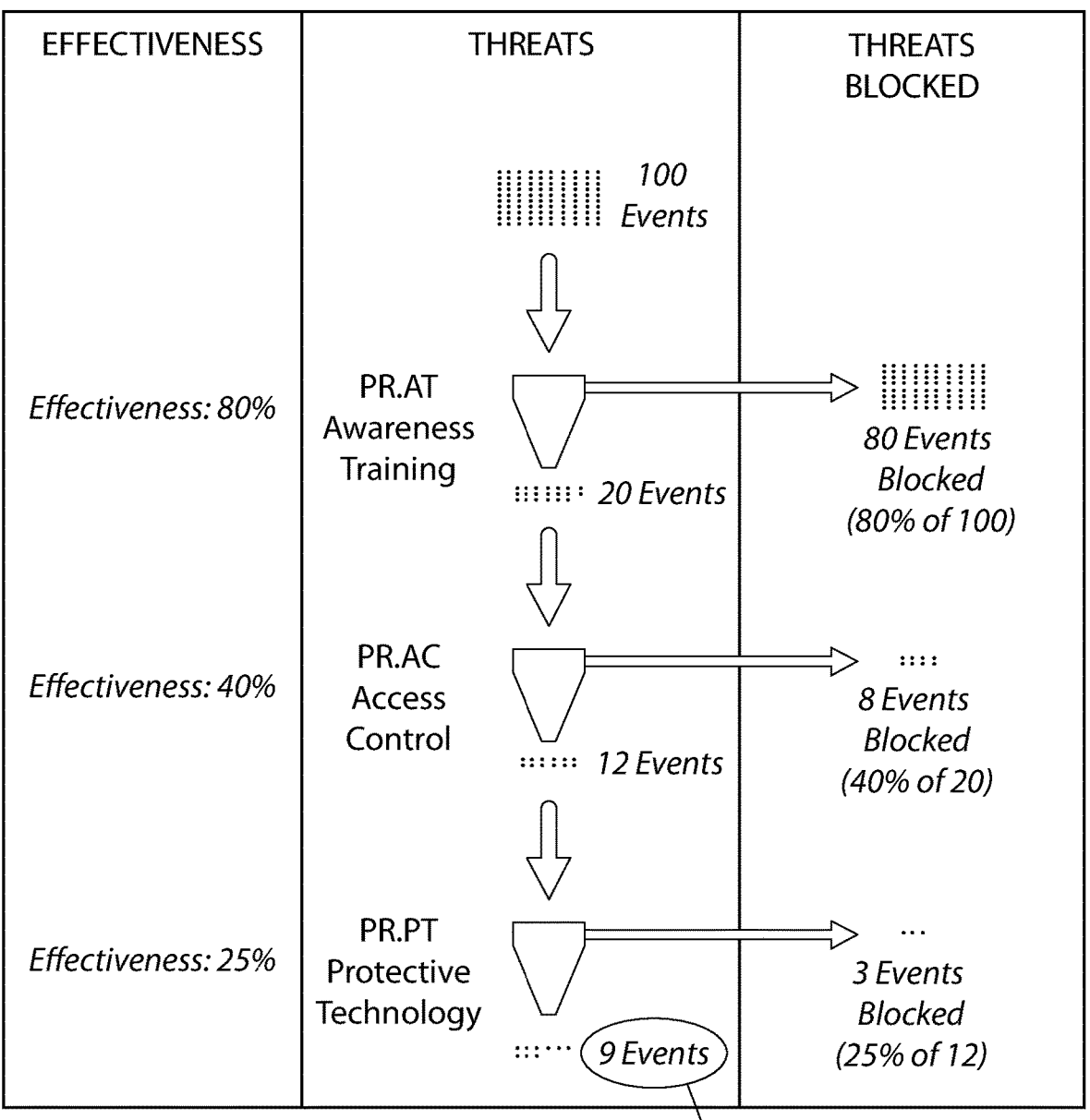
FIG. 2 is an exemplary illustration of multiple controls in series in accordance with one embodiment of the present invention.

FIG. 2 shows an example of the determination of a vulnerability score based on controls/control categories in series. Referring to FIG. 2, an asset is depicted having only three NIST CSF categories of controls: PR.AT, PR.AC, and PR.PT. The effectiveness scores for each control/control category is shown. The first NIST category encountered is PR.AT which is 80% effective. Therefore, for 100 threats, it is expected to block 80 of the threats and let 20 through. The next category of controls is PR.AC, which is 40% effective. Therefore, the controls is expected to block 40% of the threats that it encounters. Since computer system 300 encounters only the 20 threats that make it through the previous category, PR.AC is expected to block 8 threats. This process repeats for PR.PT resulting in 9 unblocked threats. Having started with 100 threats, the vulnerability score of the asset for the threat and loss event is 9%.

In some embodiments, the vulnerability score is determined using a mathematical model associated with the effectiveness scores. For example, the vulnerability score is calculated by taking the product of (100%-effectiveness scores) for each of the controls/control categories e.g., [(100%−80%)*(100%−40%)*(100%−25%)=9%]. In some embodiments, the order in which the controls/control categories is considered has no impact on the vulnerability score. In some embodiments, the vulnerability score is calculated by taking the product of the susceptibility scores for each of the controls/control categories. Further, an aggregate effectiveness score can be determined from the vulnerability score. In some embodiments, the aggregate effectiveness score is 100% minus the vulnerability score. For example, the aggregate effectiveness score for the controls/control categories mentioned above is 91% (100%−9%).

Figure 3:
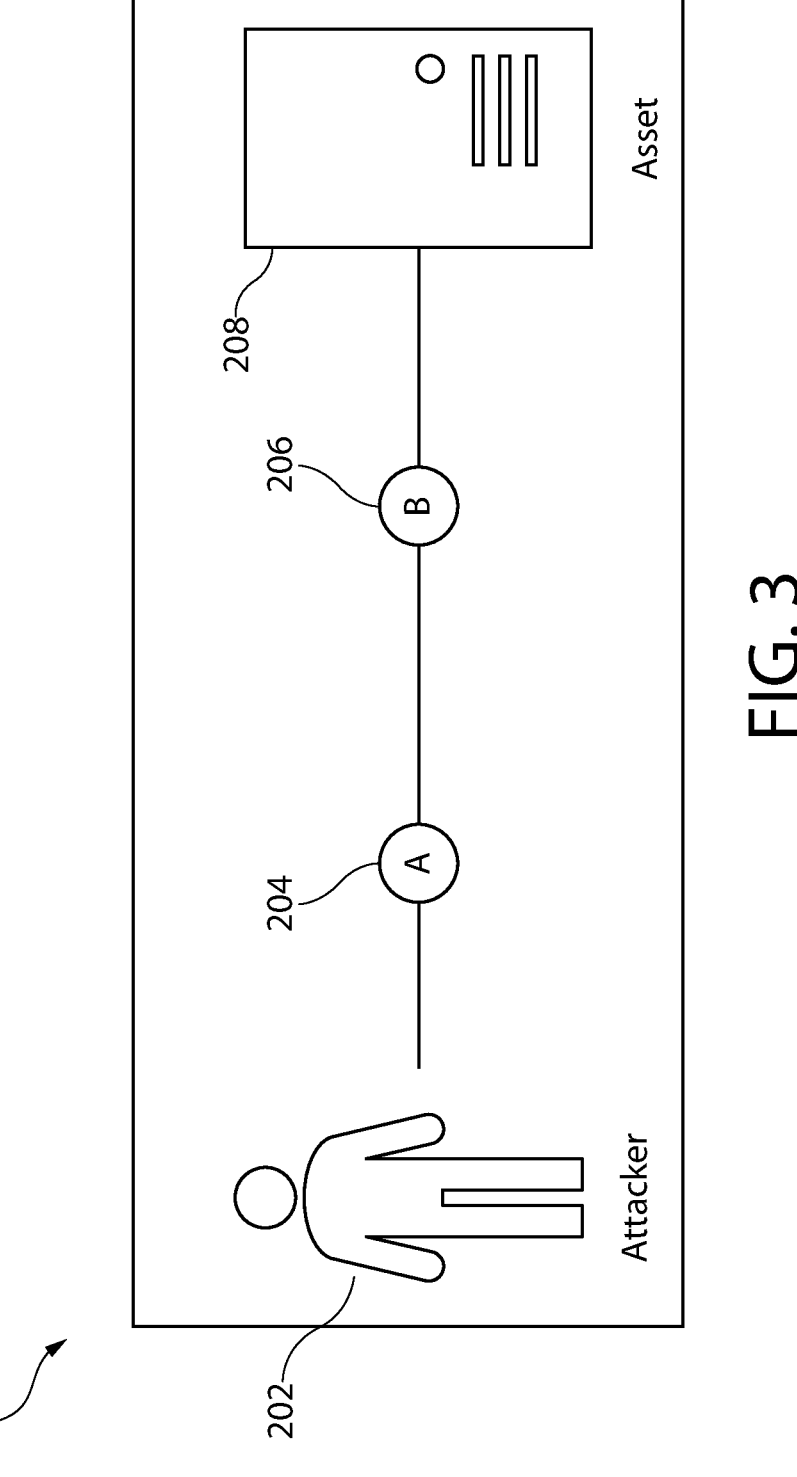
FIG. 3 is an exemplary illustration of two controls in series in accordance with one embodiment of the present invention.

Referring to FIG. 3, the vulnerability score may be determined for system 200. In some embodiments, system 200 is similar to computer system 300. In some embodiments, system 200 is confronted with a threat or attacker 202 (which can itself be a system), which presents itself as a threat to asset 208. System 200 may include one or more controls. For example, system 200 includes controls 204 and 206, which are either implemented individually and/or in aggregate to protect asset 208. In some embodiments, controls 204 and 206 are in series. Controls 204 and 206 being in series means that each of control 204 and 206 independently provides full protection to asset 208 from attacker when each of control 204 and 206 is 100% effective. In some embodiments, controls 204 and 206 each independently provide at least some degree of protection to asset 208 from attacker. Due to controls 204 and 206 being in series, the vulnerability score is calculated based on the product of 100% minus the effectiveness score of each of controls 204 and 206 or by taking the product of the susceptibility scores for control 204 and 206.

Figure 4:
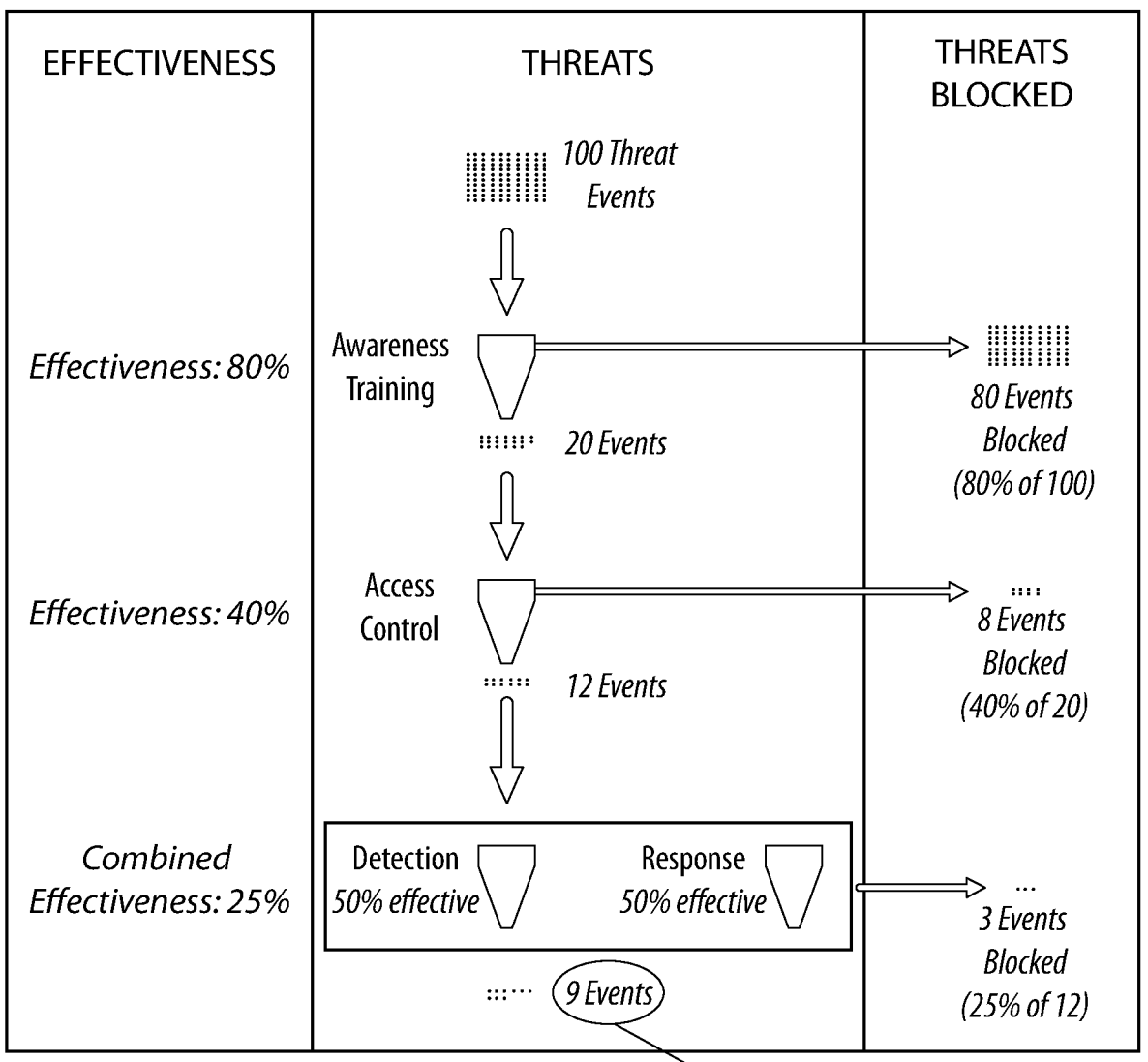
FIG. 4 is an exemplary illustration of multiple controls with a pair of controls being in parallel in accordance with one embodiment of the present invention.

Referring to FIG. 4, an example of a vulnerability score being determined based on one or more controls/control categories being in parallel (or in tandem) is shown. In some embodiments, controls/control categories that operate in parallel cannot independently prevent a loss event from occurring, as compared to controls/control categories operating in series. Such controls must operate in parallel relative to one or more controls/control categories such that the combination of controls/control categories is potentially fully protective. For example, the combination of detection and response controls both cannot on their own can prevent a loss event from occurring. However, by working together, if they can operate in a timely enough way and operate without fail, they can prevent many threat events or loss events from occurring. FIG. 4 illustrates an exemplary system in which an asset is being protected by Awareness Training, Access Controls, and a Detection and Response control being in parallel. The detection and response controls in parallel may be evaluated for their combined effectiveness and used in conjunction with the awareness training and access control in series to calculate a vulnerability score.

In some embodiments, the combined effectiveness of two or more controls/control categories that operate in parallel is determined by multiplying the effectiveness scores of the two or more controls/control categories. For example, if a detection control is 40% effective and the corresponding responsive control is 60% effective, the combined effectiveness score of the two controls is 24% (60%*40%). These two controls are then treated as a single control that is 24% effective. In some embodiments, the vulnerability score is computed by taking 1 minus the combined effectiveness score.

Figure 5:
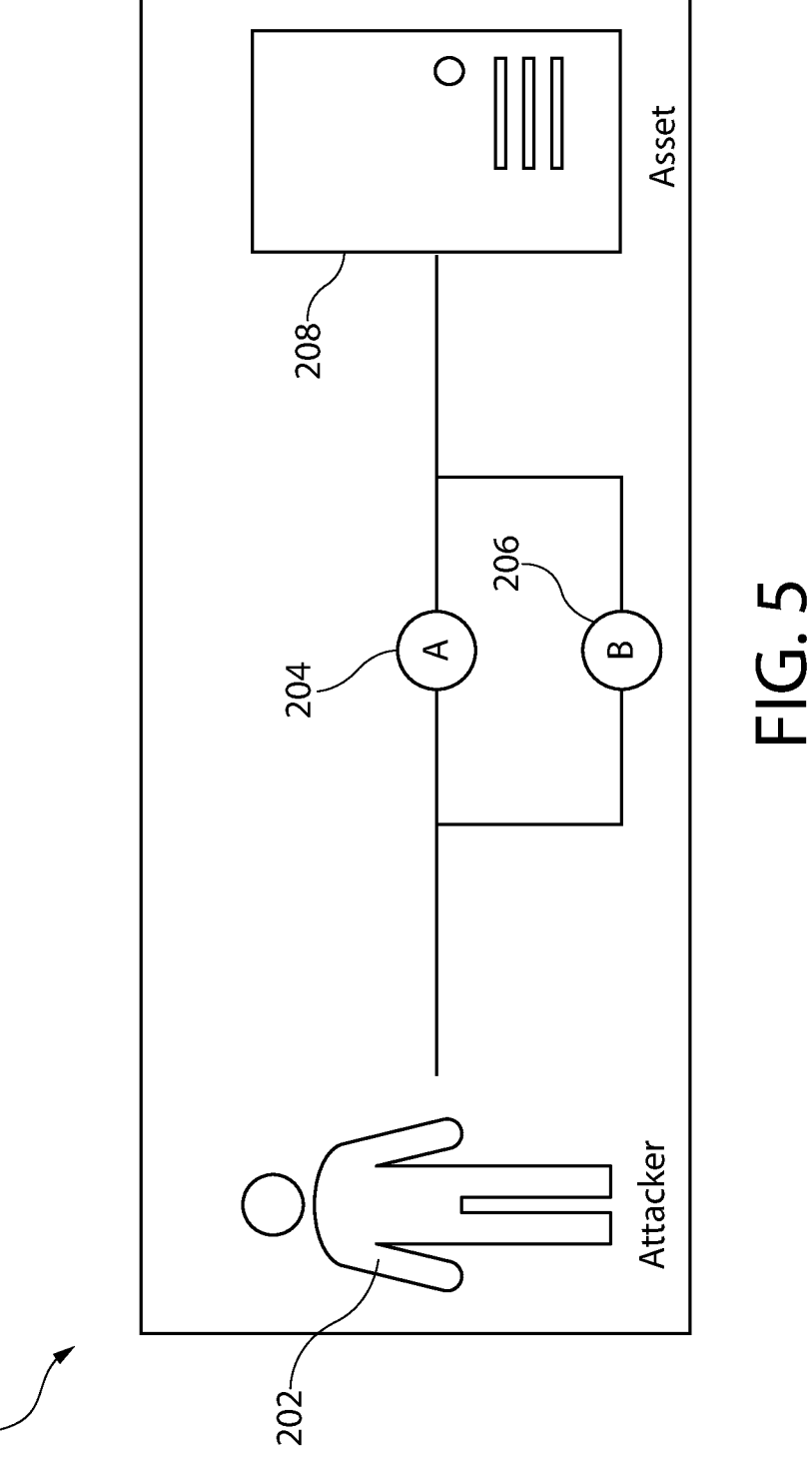
FIG. 5 is an exemplary illustration of two controls in parallel in accordance with one embodiment of the present invention.

Referring to FIG. 5, an exemplary vulnerability score is determined for system 200. In some embodiments, system 200 is configured to confront a threat or attacker 202, which may pose a threat to asset 208. For example, controls 204 and 206 may be implemented to protect asset 208. In some embodiments, controls 204 and 206 are in parallel. Controls 204 and 206 being in parallel means that controls 204 and 206 work together in parallel/tandem to provide full protection to asset 208 from attacker. Due to controls 204 and 206 being in parallel, the vulnerability score is calculated by 100% minus the product of the combined effectiveness scores of each of control 204 and control 206.

Figure 6:
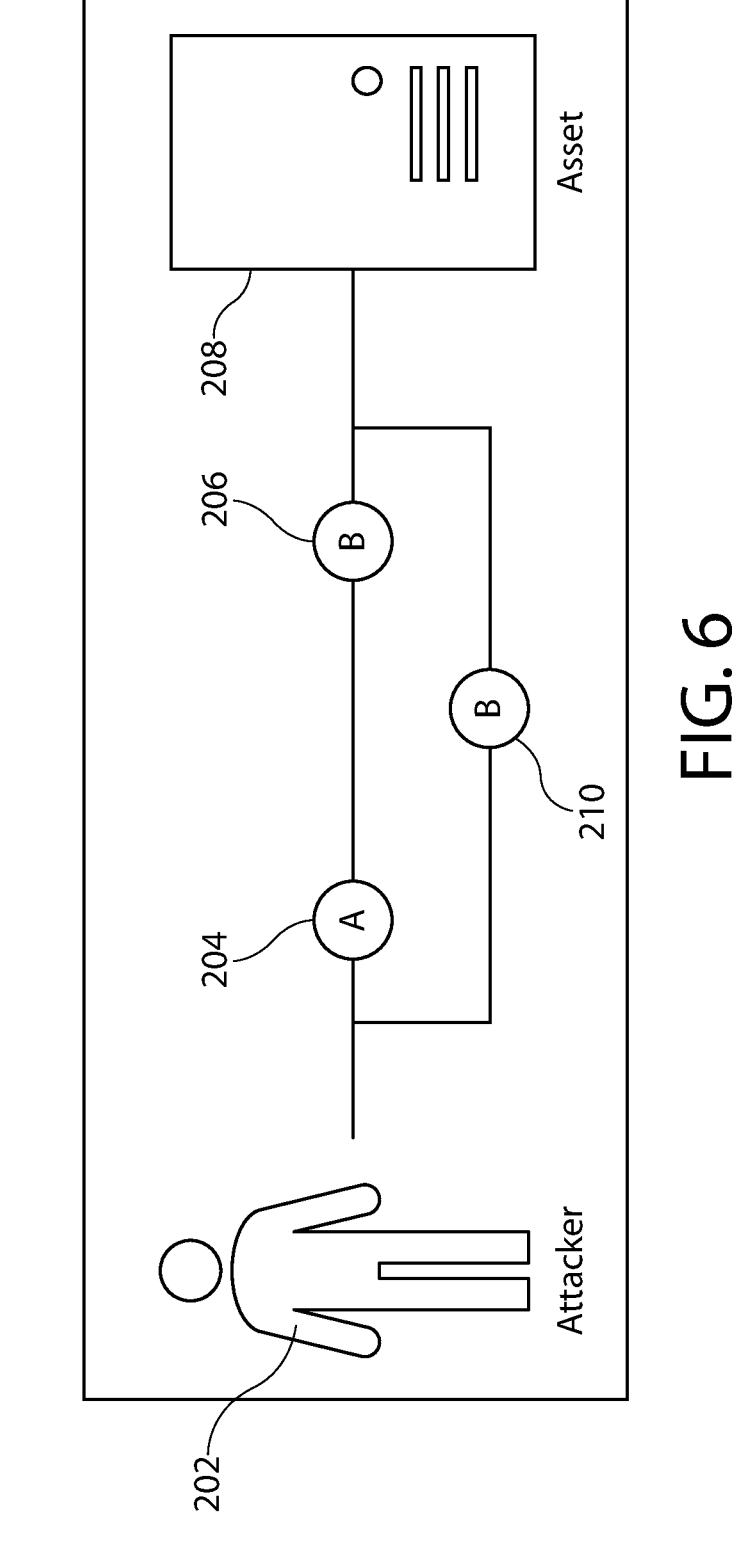
FIG. 6 is an exemplary illustration of two controls in series and one control in parallel in accordance with one embodiment of the present invention.

Referring to FIG. 6, system 200 may include exemplary controls 204, 206, and 210. System 200 may be the same or substantially the same as system 300 and may include the same components. In some embodiments, controls 204 and 206 are in series, with control 210 being in parallel to control 204 and 206. In some embodiments, the vulnerability score for controls 204 and 206 are calculated by determining the combined susceptibility score for controls 204 and 206, which is the product of the susceptibility scores of controls 204 and 206. The combined effectiveness score are calculated by 100% minus the combined susceptibility score. The total effectiveness score of control 210 in a parallel with controls 204 and 206 are determined by taking the product of the combined effectiveness score of controls 204 and 206, and the effectiveness score of control 210. In some embodiments, the vulnerability score is 100% minus the total effectiveness score.

Referring to FIGS. 7 and 8, the method 100 may be utilized using computer system 300. In some embodiments, computer system 300 automates the collection of effectiveness scores for the controls/control categories. Controls/control categories may be designed to generate metrics related to their operations and these metrics can be captured in database 401. For example, the automation process extracts control performance metrics from database 401 and algorithmically determines the control effectiveness from the metrics. The algorithm used to derive the effectiveness scores for each metric is a function of the metrics and the control. For example, the algorithm may apply weights to various control operational metrics such as coverage or response time with threat relevancy to derive the effectiveness score. In some embodiments, the algorithm data is adjusted periodically as technology evolves and the threat landscape changes. For example, the algorithm may operate to constantly update and revise the control effectiveness based on the metrics. A specific control may be obsolete due to increases in technology and thus the effectiveness of that control will need to be updated accordingly.

In some embodiments, the way in which controls are arranged relative to each other determines how effectiveness scores are combined to calculate the vulnerability scores. The arrangement/topology may be identified based on the arrangement of the controls. For example, the arrangement/topology of the controls may be in series, in parallel, or a combination of both. In some embodiments, the arrangement/topology is determined manually by surveying the control environment of the asset in question. However, once the topology has been determined, the topology is stored in database 401 and retrieved for future vulnerability assessments of the asset. This allows the vulnerability scores to be quickly determined as they will not need to be calculated, but are retrieved based on prior topologies. In some embodiments, the machine learning algorithm is trained based on prior topologies to analyze the type of topology in place, and determine and predict vulnerability scores based on the detected topology.

In some embodiments, the stored topology is validated before conducting the vulnerability assessment since the control environment may have changed since it was last surveyed. In another embodiment, the control topology for an asset may be determined by categorizing each control based on an industry standard such as the NIST CSF. The topology of the industry standard categories may be determined once and then used for each and every asset assessed.

In some embodiments, computer system 300 determines the most effective topology and arrangement of controls based on prior data and similar systems, using an algorithm, such as a machine learning algorithm. For example, computer system 300 may determine which controls and topology of controls will result in the lowest vulnerability score. In one aspect, a user indicates which controls are available and computer system 300 determines, based on historical data, which controls are needed and the arrangement of controls that would result in the lowest vulnerability score. In some embodiments, computer system 300 determines the best arrangement based on prior topologies stored in database 401.

In some embodiments, the calculations that need to be performed to calculate the effectiveness scores, susceptibility scores, and the vulnerability scores are determined by the control topology. For example, the calculations that are needed to be performed may depend on whether the controls are in series, parallel, or a combination. In some embodiments, the topology is extracted from database 401 as described above. An automated process may be used to apply the rules described herein to determine which calculations need to be performed for the given topology. The necessary calculations based on the topology may be automatically determined.

In some embodiments, instead of using control effectiveness scores to calculate vulnerability, category effectiveness scores are used. A methodology may be used to derive category effectiveness scores based on the individual control effectiveness scores within each category for the asset. For example, category effectiveness scores may be calculated for each category based on the controls within the categories. In some embodiments, category effectiveness scores are used to quickly assign an effectiveness score to the control within the category so that computer system 300 can quickly compute the vulnerability score based on just the category instead of determining the effectiveness score for each control. In some embodiments, vulnerability is determined by a combination of control effectiveness scopes and category effectiveness scores.

Exemplary computer systems, including computer hardware and software, that may be used to implement the methods of the present invention are now described with reference to FIGS. 7 and 8. The calculations performed in connection with the invention are performed by executing a computer software application using a computer processor. The inputs for the calculations can be received through human input into an appropriate computer interface. Alternatively, in some embodiments, the inputs may be received from another computer system.

Referring to FIG. 7, computer system 300 comprises hardware, including a computer processor, as described more fully herein, that is specifically programmed using code (i.e., computer readable instructions stored in a non-transitory computer readable medium) to carry out the steps of the methods and calculations described herein.

Computer system 300 includes one or more processors 301. Processor 301 may be any type of processor, including but not limited to a special purpose or general purpose digital signal processor. Processor 301 may be connected to a communication infrastructure 306 (for example, a bus or network).

Computer system 300 also includes one or more memories 302, 303. Memory 302 may be random access memory (RAM). Memory 303 may include, for example, a hard disk drive and/or a removable storage drive, such as a floppy disk drive, a magnetic tape drive, or an optical disk drive, by way of example. Removable storage drive reads from and/or writes to a removable storage unit (e.g., a floppy disk, magnetic tape, optical disk, by way of example) as will be known to those skilled in the art. As will be understood by those skilled in the art, removable storage unit includes a computer usable storage medium having stored therein computer software and/or data.

In alternative implementations, memory 303 may include other similar means for allowing computer programs or other instructions to be loaded into computer system 300. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to computer system 300. Alternatively, the program may be executed and/or the data accessed from the removable storage unit, using the processor 301 of the computer system 300.

Computer system 300 may also include a communication interface 304. Communication interface 304 allows software and data to be transferred between computer system 300 and external devices. Examples of communication interface 304 may include a modem, a network interface (such as an Ethernet card), and a communication port, by way of example. Software and data transferred via communication interface 304 are in the form of signals, which may be electronic, electromagnetic, optical, or other signals capable of being received by communication interface 304. These signals are provided to communication interface 304 via a communication path 305. Communication path 305 carries signals and may be implemented using wire or cable, fiber optics, a phone line, a wireless link, a cellular phone link, a radio frequency link, or any other suitable communication channel, including a combination of the foregoing exemplary channels.

The terms "non-transitory computer readable medium", "computer program medium" and "computer usable medium" are used generally to refer to media such as removable storage drive, a hard disk installed in hard disk drive, and non-transitory signals, as described herein. These computer program products are means for providing software to computer system 300. However, these terms may also include signals (such as electrical, optical or electromagnetic signals) that embody the computer program disclosed herein.

Computer programs are stored in memory 302 and/or memory 303. Computer programs may also be received via communication interface 304. Such computer programs, when executed, enable computer system 300 to implement the present invention as discussed herein. Accordingly, such computer programs represent controllers of computer system 300. Where the invention is implemented using software, the software may be stored in a computer program product and loaded into computer system 300 using removable storage drive, hard disk drive, or communication interface 304, to provide some examples.

In some embodiments, the methods are carried out by a system, such as system 300, that employs a client/server architecture. Such exemplary embodiments are described as follows with reference to FIG. 8. The data that may be used as an input to the system (e.g., system 300), and the outputs to the system, may be stored in one or more databases 401. Database server(s) 402 may include a database services management application 403 that manages storage and retrieval of data from the database(s) 401. The databases 401 may be relational databases; however, other data organizational structure may be used without departing from the scope of the present invention.

One or more application server(s) 404 are in communication with the database server 402. The application server 404 communicates requests for data to the database server 402. The database server 402 retrieves the requested data. The application server 404 may also send data to the database server 402 for storage in the database(s) 401. The application server 404 comprises one or more processors 405, non-transitory computer readable storage media 407 that store programs (computer readable instructions) for execution by the processor(s) (e.g., to perform the calculations described herein), and an interface 406 between the processor(s) 405 and non-transitory computer readable storage media 407. The application server 404 may store the computer programs referred to herein (i.e., the computer programs that are used in connection with collecting data and calculating loss amounts), as described more fully herein.

To the extent data and information is communicated over the Internet or an Intranet, one or more Internet/Intranet servers 408 may be employed. The Internet/Intranet server 408 also comprises one or more processors 409, computer readable storage media 411 that store programs (computer readable instructions) for execution by the processor(s), and an interface 410 between the processor(s) 409 and computer readable storage media 411. The Internet/Intranet server 408 is employed to deliver content that can be accessed through the communications network 412, e.g., by an end user employing computing device 413. When data is requested through an application, such as an Internet browser, the Internet/Intranet server 408 receives and processes the request. The Internet/Intranet server 408 sends the data or application requested along with user interface instructions for displaying a user interface on device 413.

The computers referenced herein are specially programmed to perform the functionality described herein.

The non-transitory computer readable storage media (e.g., 407 or 411) that stores the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A method of deriving an aggregate vulnerability of a computer system, the method comprising:
  categorizing topologies of controls into categories;
  evaluating topologies of controls against hypothetical threat events to produce a control effectiveness score for each topology versus threat events by aggregating the controls that make up each of the topologies;
  deriving category effectiveness scores for each of the categories;
  storing the topologies, the control effectiveness scores, and the category effectiveness scores in a database of topologies;
  identifying a threat event associated with a possible loss;
  based on the threat event, identifying topologies from the database of topologies configured to provide protection against the threat event, based on both the control effectiveness scores and the category effectiveness scores;
  deriving an updated control effectiveness score for each of the identified topologies;
  determining, based on the updated control effectiveness score, a vulnerability score associated with the topologies;
  selecting a select one of the topologies to protect against the threat event based on the updated control effectiveness score;
  validating the selected topology to ensure that the computer system control environment has not changed since the selected topology was evaluated; and
  activating, after validating, the selected topology.

2. The method of claim 1, wherein the vulnerability score is determined via a mathematical model associated with the effectiveness score.

3. The method of claim 2, wherein the mathematical model is determined based on a relationship of the plurality of relevant controls.

4. The method of claim 1, wherein each of the topologies is associated with at least one control category.

5. The method of claim 1, wherein the topologies include a plurality of relevant controls that are configured to be in series relationship with one another.

6. The method of claim 1, wherein the topologies include a plurality of relevant controls that are configured to be in parallel relationship with one another.

7. The method of claim 1, wherein the topologies include a plurality of relevant controls that are configured to be in parallel and in series with one another.

8. The method of claim 1, wherein the effectiveness score is automatically determined based on metrics associated with the topology.

9. The method of claim 1, wherein a relationship between the topology and the threat event is automatically determined based on scenarios stored in a database.

10. The method of claim 1 wherein the computer system is used to collect personal data and the method further comprises:
  based on the vulnerability score, updating at least one of anti-virus software, anti-malware software, spam filters, and phishing filters that are running on at least one component of the computer system.

11. The method of claim 10 wherein the updating is based on the vulnerability score reaching a predefined threshold.

12. A computer implemented method comprising:
  receiving, via an interface of a computer based application, data related to a loss event, the data including a threat event;
  identifying, via a processor of the computer based application, a plurality of topologies of controls associated with preventing the threat event from occurring;
  grouping, via the processor of the computer based application, the plurality of topologies of controls into a plurality of control categories;
  deriving control effectiveness scores for each of the topologies;
  storing, via a database of the computer based application, a plurality of category effectiveness scores associated with each of the plurality of control categories, wherein each of the plurality of category effectiveness scores is a probability that each of the plurality of control categories prevents the threat event from occurring;
  assigning, via the processor of the computer based application, each of the plurality of category effectiveness scores to each of the plurality of control categories;
  aggregating, via the processor of the computer based application, the control effectiveness score for each of the plurality of control categories based on a relationship between the plurality of control categories to determine and an annualized loss amount;
  determining a vulnerability score based on the category effectiveness scores and the control effectiveness scores;
  predicting, via the processor of the computer based application, a new vulnerability score and a new annualized loss based a change to one or more of the plurality of control categories;
  selecting a select one of the topologies to protect against the threat event based on the new vulnerability score;
  validating the selected topology to ensure that the computer system control environment has not changed since the selected topology was evaluated; and
  activating, after validating, the selected topology.

13. The computer implemented method of claim 12 further comprising filtering the data to remove redundant or irrelevant data.

14. The computer implemented method of claim 12, wherein each of the plurality of controls independently prevents the threat event from occurring.

15

16

15. The computer implemented method of claim 12, wherein at least two of the plurality of controls tandemly prevent the threat event from occurring.

16. The computer implemented method of claim 12, wherein each of the plurality of effectiveness scores of each of the plurality of control categories is displayed, via the interface of the computer based application, as a percentage of threat events prevented by each of the plurality of control categories.

17. The computer implemented method of claim 12, further comprising:

determining a plurality of non-effectiveness scores associated with each of the plurality of control categories, wherein each of the plurality of non-effectiveness scores is a probability that each of the plurality of control categories allows the threat event to occur.

18. The computer implemented method of claim 17, wherein the vulnerability score is a product of each of the plurality of non-effectiveness scores.

19. The computer implemented method of claim 12, wherein the threat event is an event causing the loss event.

20. The computer implemented method of claim 12, wherein the annualized loss amount is an amount of money expended due to the loss event.

21. The computer implemented method of claim 12, further comprising:

determining a plurality of effectiveness scores associated with each of the plurality of control categories, wherein each of the plurality of effectiveness scores is a probability that each of the plurality of control categories prevents the threat event from occurring.

22. The computer implemented method of claim 21, wherein the vulnerability score is equal to one minus a product of each of the plurality of effectiveness scores.

\* \* \* \* \*